United States Patent
Fitzgibbon et al.

(10) Patent No.: US 8,030,796 B2
(45) Date of Patent: Oct. 4, 2011

(54) SYSTEM AND METHOD FOR CONTROLLING CURRENT IN A MOVABLE BARRIER OPERATOR

(75) Inventors: James J. Fitzgibbon, Batavia, IL (US); Robert J. Olmsted, Wood Dale, IL (US); Robert Daniel-Wayman, Lombard, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 469 days.

(21) Appl. No.: 10/930,648

(22) Filed: Aug. 31, 2004

(65) Prior Publication Data
US 2005/0253544 A1   Nov. 17, 2005

Related U.S. Application Data

(63) Continuation-in-part of application No. 10/844,016, filed on May 12, 2004, now Pat. No. 7,302,775.

(51) Int. Cl.
*H02J 3/14* (2006.01)
*H02H 9/08* (2006.01)
*H02H 9/00* (2006.01)

(52) U.S. Cl. ............ 307/39; 307/38; 361/93.9; 361/103
(58) Field of Classification Search ............ 361/63, 361/103, 93.9; 49/31; 307/32, 38, 39
See application file for complete search history.

(56) References Cited

U.S. PATENT DOCUMENTS

| | | | |
|---|---|---|---|
| 2,564,510 A | 8/1951 | Shoemaker | |
| 2,736,553 A | 2/1956 | Brown | |
| 3,119,608 A | 1/1964 | Bateman | |
| 3,135,469 A | 6/1964 | Hanson | |
| 3,683,101 A | 8/1972 | Liberman | |
| 3,699,235 A | 10/1972 | Wasson et al. | |
| 3,725,568 A | 4/1973 | Stanley | |
| 3,797,375 A * | 3/1974 | Cerola | 99/340 |
| 3,931,452 A | 1/1976 | Nilsson | |
| 4,062,052 A * | 12/1977 | Harper et al. | 361/28 |
| 4,408,146 A * | 10/1983 | Beckerman | 318/264 |
| 5,521,359 A * | 5/1996 | Bone | 219/679 |
| 5,732,898 A | 3/1998 | Odessky et al. | |
| 5,969,637 A | 10/1999 | Doppelt et al. | |
| 6,157,008 A * | 12/2000 | Brown et al. | 219/486 |
| 6,172,475 B1 * | 1/2001 | Fitzgibbon et al. | 318/266 |
| 6,184,641 B1 | 2/2001 | Crimmins et al. | |
| 6,198,047 B1 | 3/2001 | Barr | |
| 6,350,135 B1 | 2/2002 | Acklin et al. | |
| 6,870,141 B2 * | 3/2005 | Damrath et al. | 219/490 |

(Continued)

FOREIGN PATENT DOCUMENTS

FR   2 823 022   10/2002

(Continued)

OTHER PUBLICATIONS

Search Report Under Section 17 Dated Aug. 3, 2005 for GB0509639.1.

(Continued)

*Primary Examiner* — Jared Fureman
*Assistant Examiner* — Scott Bauer
(74) *Attorney, Agent, or Firm* — Fitch Even Tabin & Flannery

(57) ABSTRACT

A barrier operator comprises a current limit portion and a barrier operator portion. The current limit portion is coupled to a mains supply and the barrier operator position is coupled to the mains supply and the current limit portion. The barrier operator portion actuates a movable barrier. The current limit portion regulates electrical current to at least one additional device.

18 Claims, 7 Drawing Sheets

U.S. PATENT DOCUMENTS

| | | |
|---|---|---|
| 7,302,775 B2 | 12/2007 | Olmsted |
| 2001/0010032 A1* | 7/2001 | Ehlers et al. .............. 702/62 |
| 2005/0116541 A1* | 6/2005 | Seiver ..................... 307/16 |

FOREIGN PATENT DOCUMENTS

| | | |
|---|---|---|
| FR | 2823022 A1 | 10/2002 |
| WO | 0037748 A1 | 6/2000 |
| WO | WO 00/37748 | 6/2000 |
| WO | WO 02/21660 A1 * | 3/2002 |

OTHER PUBLICATIONS

British Examination Report Under Section 13(3) for GB0509639.1 Dated May 1, 2007.

* cited by examiner

*Fig.* 9
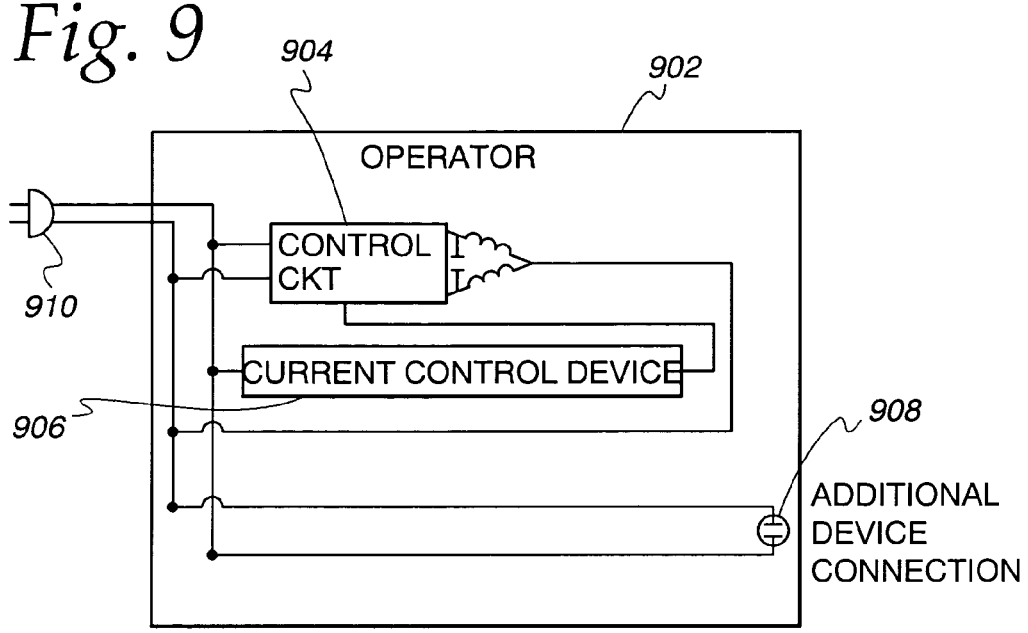
*Fig.* 10
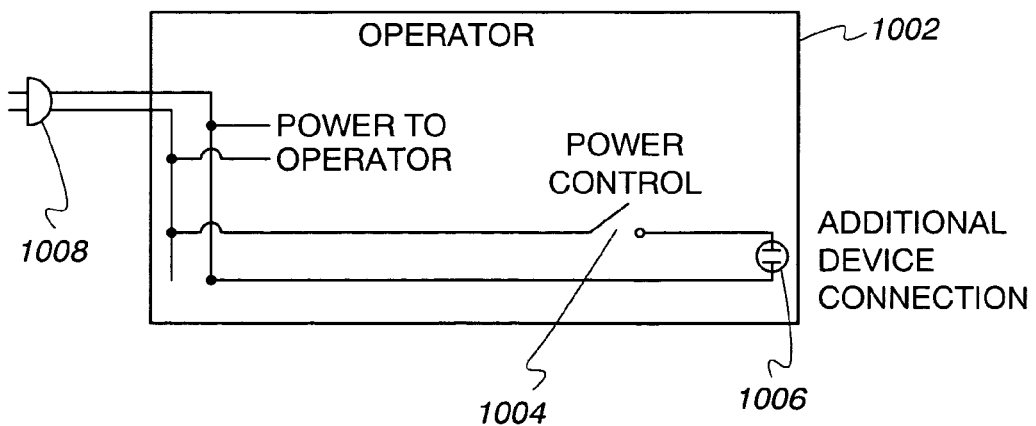

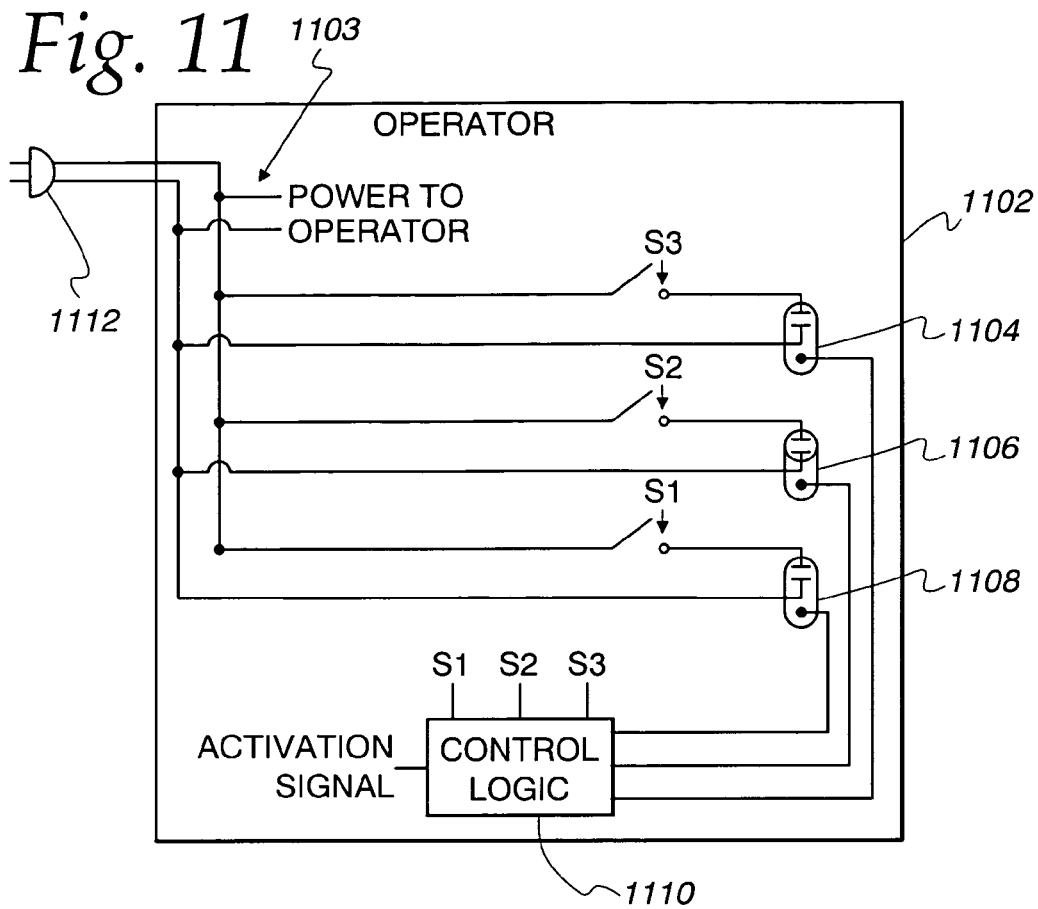
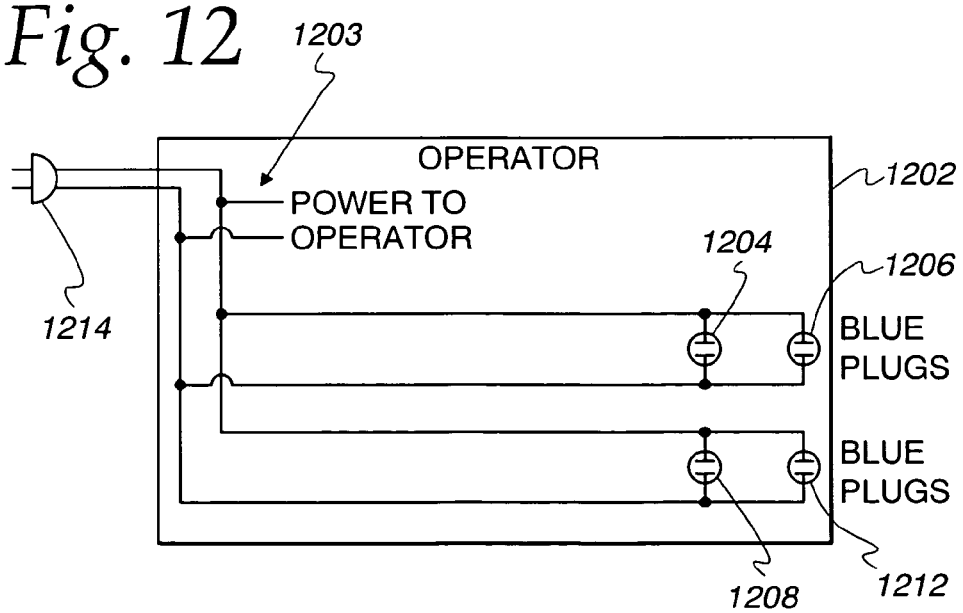

SYSTEM AND METHOD FOR CONTROLLING CURRENT IN A MOVABLE BARRIER OPERATOR

CROSS-REFERENCE TO RELATED APPLICATION

This application is a continuation-in-part of U.S. application Ser. No. 10/844,016, filed on May 12, 2004 now U.S. Pat. No. 7,302,775 and incorporated by reference in its entirety.

BACKGROUND OF THE INVENTION

Barrier movement operators generally include power and control systems for responding to operator inputs and sensed conditions to move a barrier between open and closed positions with respect to an opening. The barrier may be a door, a gate, a window, a window shade/protector or similar apparatus. Garage door operators are a common form of barrier movement operator.

One type of garage door operator comprises a head end with control circuitry and a motor that extends and retracts a trolley connected to the door. The trolley moves along a rail connected between the head end and a support wall of a garage at a point above the garage opening. Such a trolley and rail type of garage door operator is generally supported from an overhead structure such as the ceiling joists of a garage. Support is often achieved by vertical metal support members from the housing of the head end to the ceiling joists which may result in a less than stylish connection.

Ancillary equipment or accessories can be used to improve the functionality of the garage in which the garage door operator is mounted. For example, additional lighting is often placed in the garage, which in some instances, may be controlled by the controller of the head end. Also, a readily available extension cord and/or a mechanic's light is sometimes provided in the garage. The garage door operator itself may gain advantage to having an attached security camera, monitor, motion sensor and other sensing equipment. In previous systems, the inclusion of such additional equipment results in a mix of non-similar items affixed throughout the garage.

In previous systems, the amount of current that an electrical outlet can supply to an operator and its accessories is limited by a circuit breaker. The current flows from the outlet to the operator and the accessories. When the barrier is moved, the movable barrier operator requires a large percentage of the current flowing from the outlet to operate. Both during the starting of the motor and situations where high force is required, the amount of current needed is at a peak. If during the starting of the motor, the sum of the operator current and the current supplied to the additional devices is above the threshold of the circuit breaker, the circuit breaker trips, current flow is halted, and the operator is unable to complete its operation. When the circuit breaker trips, the operation of the operator and the additional devices is impaired resulting in significant inconvenience to the user.

Previous systems do not deal with this situation effectively. Also, in previous systems the power made available to the ancillary devices is the same regardless of whether the operator is active or inactive or which of the ancillary devices is in operation. This results in an inefficient use an allocation of system resources.

SUMMARY OF THE INVENTION

A barrier operator includes a current limiting portion to limit the current supplied to additional or ancillary devices of a barrier operator system. The current limiting portion removes the possibility of tripping an external circuit breaker when a current surge occurs. The safety of the system is enhanced, and at the same time, the power available for the ancillary devices is customized depending upon whether the operator or one of the other ancillary devices is active.

In many of these embodiments, a barrier operator includes a barrier operator portion and a current limit portion. The current limit portion is coupled to a mains supply. The barrier operator portion is coupled to the current limit portion and the mains supply. The current limit portion limits the electrical current made available to at least one ancillary device.

The current limit portion of the operator may include a single current limit device or multiple current limit devices. In addition, the current limit portion may include a controller. The controller receives information indicative of the type of the at least one additional device.

If a controller is used, the controller can make decisions concerning the activation of the additional devices based upon the type of device or other factors. For instance, if a first device is a compressor, a second device is a florescent light, and the third device is a heater, the controller can activate the compressor and heater when the operator is activated but leave the light deactivated. In addition, the controller can leave on the florescent light but not turn on the work light, if the approach would lower the current. The controller can be flexibly programmed to make these decisions based upon the specific needs of a user and the quantity of available current.

The additional device may include a variety of different types of devices used in garages, for example, lights, heaters, sensors, security devices and compressors. The current limit device may be a secondary circuit breaker, positive temperature coefficient resistor, current detecting circuit, switch or fuse. Other examples current limiting devices are possible.

Thus, a system and method is provided that prevents the tripping of a circuit breaker supplying current to an operator. This approach allows for a more convenient use experience during the operation of the operator and effectively manages current surges. Since current surges are effectively managed, operating conditions for a user are made more safe. Also, power is managed mote effectively because the state of the operator is considered on determining the amount of power supplied to ancillary devices. This results in the smoother and more efficient operation of the system.

BRIEF DESCRIPTION OF DRAWING

FIG. 9 is a system for controlling in the distribution of current according to the present invention;

FIG. 10 is a system for controlling in the distribution of current according to the present invention;

FIG. 11 is a system for controlling in the distribution of current according to the present invention; and FIG. 12 is a system for controlling in the distribution of current according to the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful in a commercially feasible embodiment are often not depicted in order to facilitate a less obstructed view of the various embodiments of the present invention.

DETAILED DESCRIPTION OF THE PREFERRED EMBODIMENTS

Figure 1:
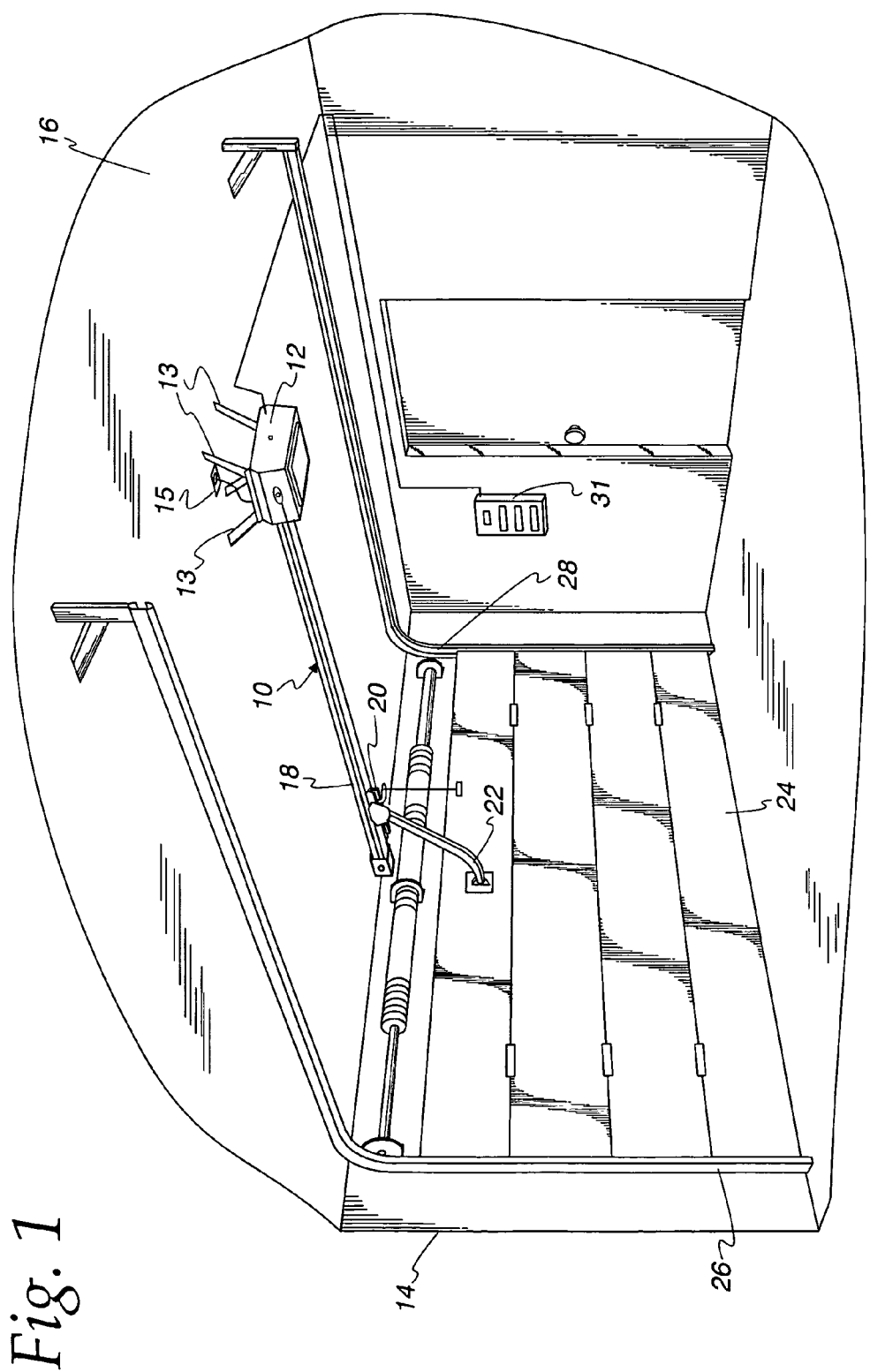
FIG. 1 is a perspective view of a mounted prior art barrier movement operator.

Referring now to FIG. 1, a perspective view of the inside of a secure area such as a garage, having a known barrier movement operator is described. The area has a ceiling 16 and a front wall 14 with a doorway (not shown) therethrough which is opened and closed by a paneled garage door 24. The position of the door 24 is controlled by a barrier movement operator head end 12 which moves a trolley 20 out and back along a rail 18. The trolley 20 is connected to door 24 by a trolley/door arm 22. The door 24 includes rollers at its edges which engage doorguides 26 and 28 and as the trolley 20 is drawn toward the head end 12 the door 24 is raised in the doorguides to a substantially horizontal position. The movement of the door may be controlled by user interaction with a wall control unit 31 which signals the head end of the user's requests. The head end 12, which includes an electric motor, is powered from a maims voltage outlet 15 and is supported from the joists of the ceiling by support members 13. Other sensors and signaling devices may be used to control barrier movement, but are not described because they are not necessary for an understanding of the present invention.

Figure 2:
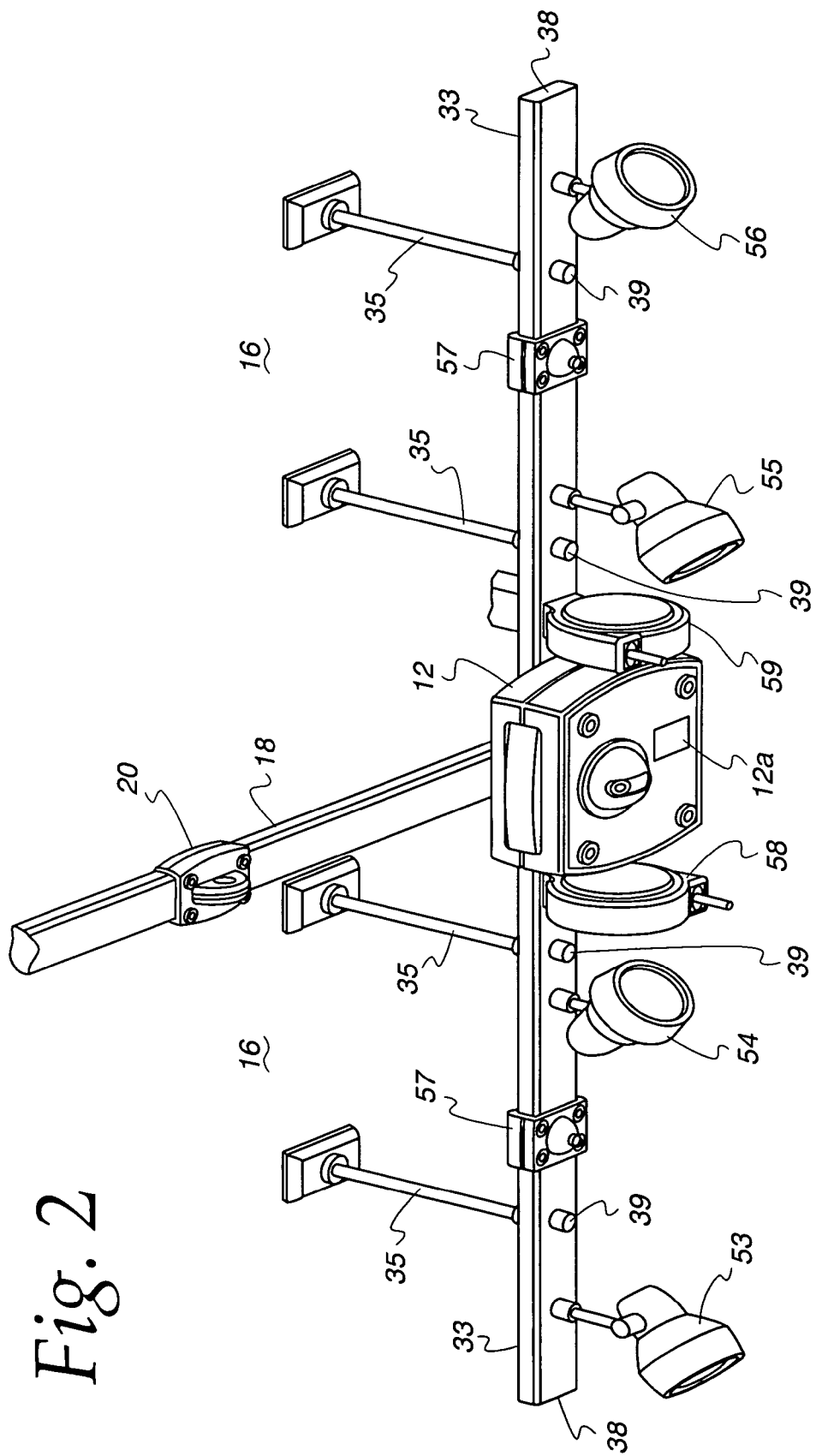
FIG. 2 is a perspective view of an improved barrier movement operator mounting according to the present invention.
Figure 3:
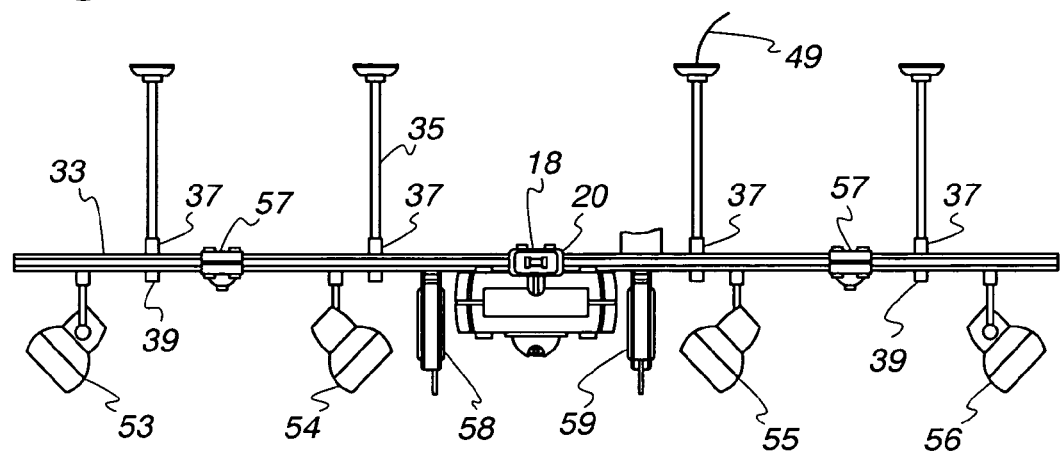
FIG. 3 is a front plan view of the mounting of FIG. 2 according to the present invention.
Figure 4:
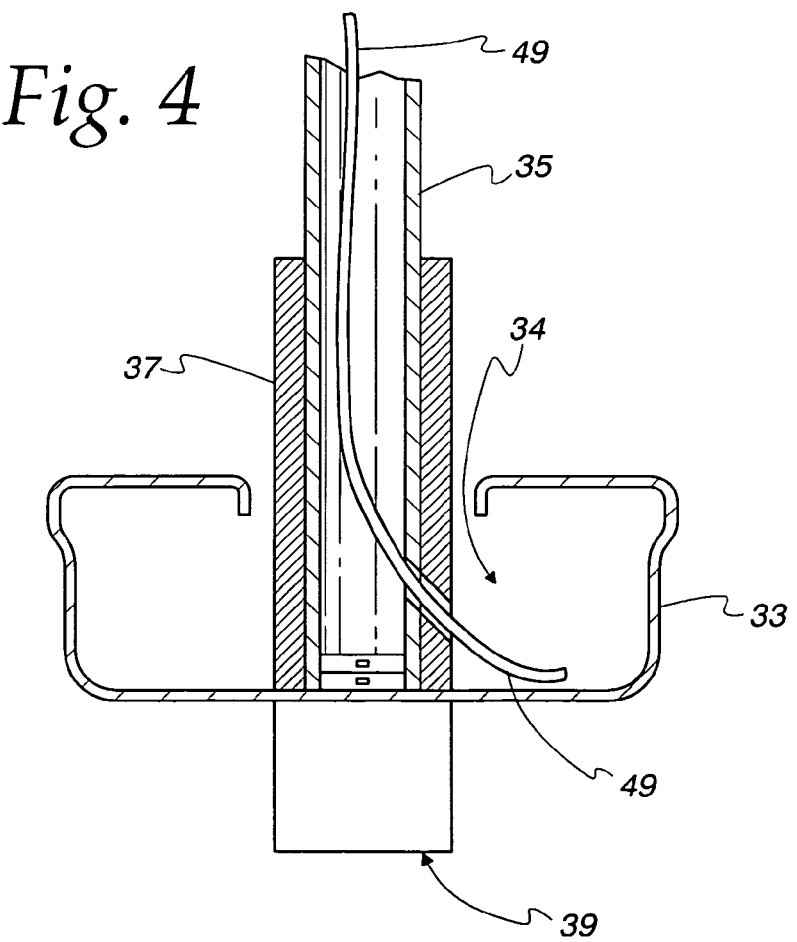
FIG. 4 is an end view of an elongate member and vertical support used in FIG. 2 according to the present invention.

FIG. 2 is an upward perspective view of a combined barrier movement operator support and power busing system. The trolley of the FIG. 2 arrangement may be connected to a trolley/door arm 22 as shown in FIG. 1 to raise and lower a door or other barrier. FIG. 3 is a view of the same structure as FIG. 2, but the view is from the front of the garage, along the trolley rail 18. The structure of FIG. 2 includes an elongate member 33 which is supported by a plurality of vertical members 35 from an over head structure. The over head structure may be ceiling joists or another support member secured to the overhead structure of the garage. Elongate member 33, which is shown in cross section in FIG. 4, comprises an open trough 34 which may be fabricating by roll forming 16 gauge sheet steel. The open trough 34 runs the length of the elongate member and may be used to provide power to accessories attached to the elongate member as discussed below.

Vertical members 35 may comprise hollow tubes having a shoulder portion 37 at a bottom thereof Shoulder portion is affixed to the hollow tube vertical member 35 and includes female threads at the open end thereof. The elongate member 33 includes a plurality of mounting holes and the vertical members 35 are connected to the elongate member 33 by bolts 39 screwed into the female inner threads of shoulders 37 through the holes. The open ends of elongate member 33 may be closed by end caps 38.

The operator 12 includes a current limit portion 12a. The current limit portion 12a controls current to the additional devices 53, 54, 55, 56 and 57. As described in greater detail below, the current limit portion 12a may include a single current limit device or multiple current limit devices. In addition, the current limit portion 12a additional may include a controller. In one example, the controller receives information indicative of the type of the at least one additional device.

Figure 6:
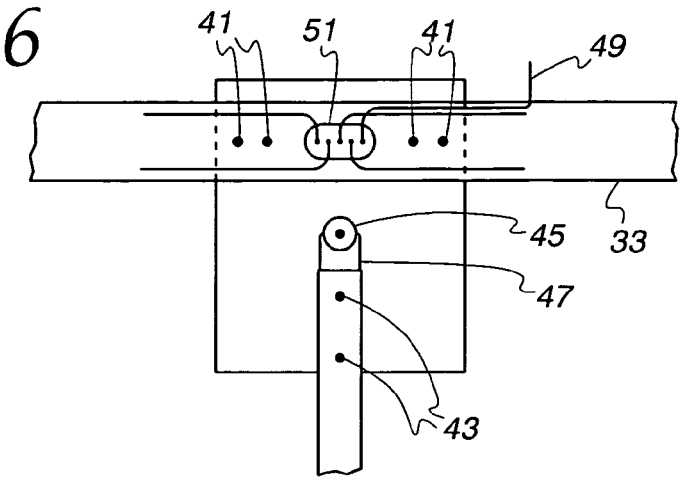
FIG. 6 is a top view of the barrier movement operator according to the present invention.

FIG. 6 is a top plan view of the barrier movement operator 12 portion of the elongate member 33 and portion of the trolley tail 18. The barrier movement operator 12 is secured to the elongate member 33 by means of a plurality of bolts 41 which extend through the elongate member 33 into threaded holes in the barrier movement operator. Similarly, the trolley rail 18 is secured to the top of barrier movement operator 12 by means of a pair of bolts 43 through the rail and into barrier movement operator, Also shown in FIG. 6 is a drive sprocket 45 which is rotated by a motor (not shown) to move a chain 47 which is attached to trolley 20. Mains voltage may be provided to the barrier movement operator by a multi conductor power wire 49 which passed through one of the hollow vertical supports 35 and into the hollow trough 34 of elongate member 33. Power wire 49 runs along the interior 34 of elongate member 33 and is passed to the barrier movement operator 12 via an opening 51 in the elongate member.

The elongate member 33 also includes a number of points at which accessories can be attached to provide additional functionality. As shown in FIG. 3, light fixtures 53 and 54 are attached to a portion of the elongate member 33 to the left of the barrier movement operator 12 and light fixtures 55 and 56 are attached to the right. Further, a retractable cord, mechanic's light 58 is attached to the elongate member as is a retractable hose reel 59 for supplying compressed air from a compressor 52. In other embodiments, other accessories such as a battery charger, security camera, CO monitor, motion detector etc., may be attached to the elongate member 33.

Figure 5:
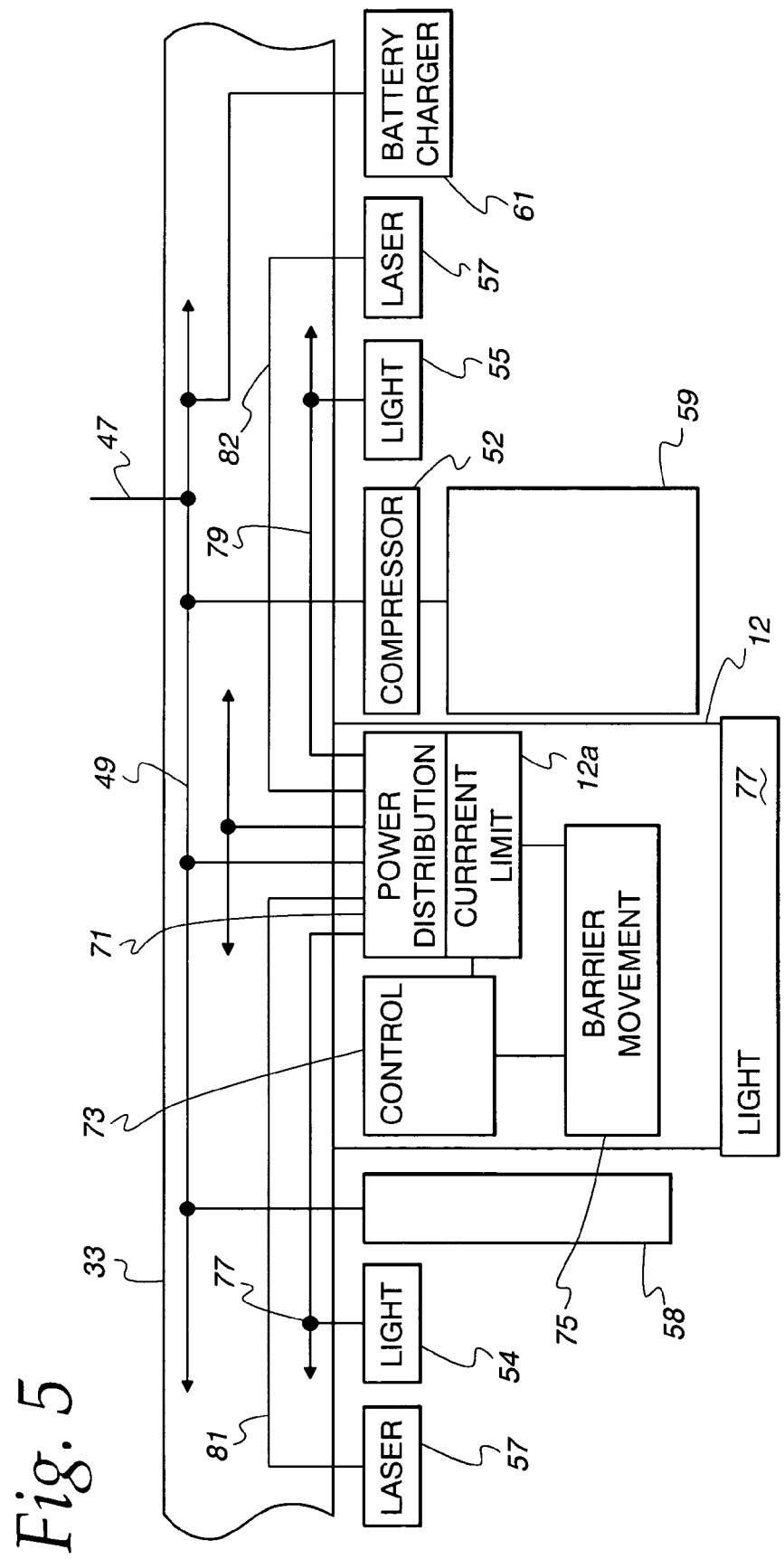
FIG. 5 is an electrical block diagram illustrating power distribution according to the present invention.

FIG. 5 is an electrical block diagram illustrating the connection and distribution of electrical power using the arrangement of FIG. 2. In FIG. 5 a portion of the elongate member 33 is shown to represent its power distribution or power bus function and barrier movement operator 12 is shown in block diagram form. Barrier movement operator 12 comprises power distribution apparatus 71, a controller 73, barrier movement apparatus 75, a light assembly 77, and the current limit portion 12a. The current limit portion 12a limits current to the additional or ancillary devices. Barrier movement apparatus 75 may include a motor and sensors (not shown) which cooperate with control unit 73 to open and close a barrier. Power distribution unit 71 is equipped to receive mains voltage and to distribute mains voltage, or another created voltage, under the control of controller 73. The light 77 is a common part of barrier movement operators and is used to provide one source of illumination under the control of controller 73.

Power wire 49 is connectable to a source of mains voltage and connects that voltage to power distribution unit 71. Power distribution unit 71 distributes power within barrier movement operator 12 as is needed to provide barrier movement. Controller 73 is also responsible for controlling the application of mains voltage and other electrical power derived therefrom to accessories connected to barrier movement operator 12.

The following are examples of power distribution via elongate member 33. The mains power on power conductor 49 may be distributed directly to attached accessories on elongate member 33 by connection to the power conductor. For example, one accessory may be a "night light" which is continuously powered, but which senses light levels and turns on the "night light" when light levels drop below a predetermined level. Further, the mechanics' light and cord reel 58 and the compressor 52 may be permanently supplied with mains power by connection to power conductor 49. A battery charger 61 may also be permanently connected to mains power. AC mains power may be selectively provided to accessories by the power distribution unit 71 under the control of controller 73. For example, when a left hand garage door is being opened lights 54 and 53 may receive mains power from power distribution 71 via conductor 77. Similarly, lights 55 and 54 may receive mains power from power distribution unit 71 via conductor 79 when a right hand garage door is being opened. Further, laser positioning devices 57 may receive power via conductor 81 or 82 to create a light spot only briefly when a vehicle is entering one side or the other of the garage. The power sent to a laser light 57 may be AC mains or DC created by power distribution 71 under control of controller 73. In addition, conductors 91 may be employed by power distribution 71 to distribute low voltage power along elongate member 33 or potentially a lower mains voltage to dim the lighting.

In the preceding embodiments, elongate member is shown as being open at the top. The elongate member may be closed on its top to provide protection against improper contact with household voltage. The barrier movement operator is shown in the preceding, attached to the underside of the elongate member. In other embodiments, the barrier movement operator may be attached to the top of the elongate member and rest thereon. Mains power was supplied to the apparatus by a power cord 49 passing through a hollow vertical support 35. In other embodiments, the power cord may be connected to mains power without passing through a vertical support and such power may be supplied directly to barrier movement operator 12 via a power cord as shown in FIG. 1.

Figure 7:
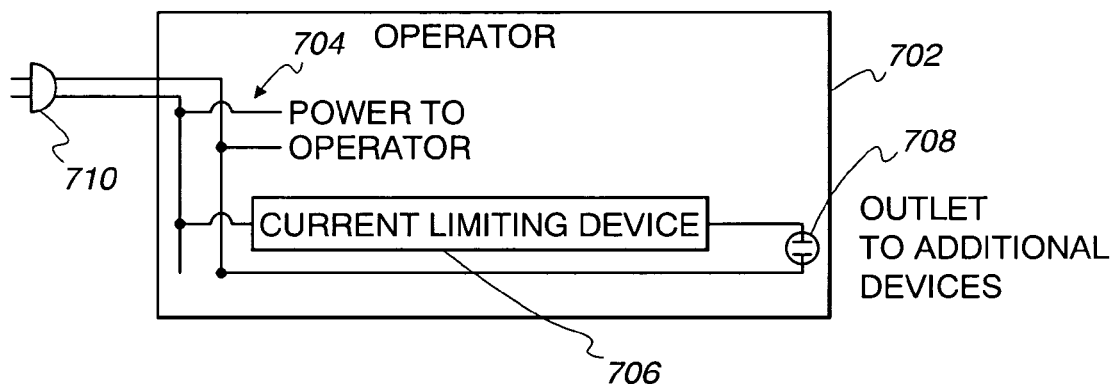
FIG. 7 is a system for controlling in the distribution of current according to the present invention.

Referring to FIG. 7, one example of an operator with a current limiting device is described. A power plug 710 is placed in a power outlet to supply power and current to the operator 702 via power lines 704 from a mains supply. In one example, the mains supply may be the standard 110V residential supply in the United States. However, other examples of mains supplies are possible. A current limiting device 706 limits the current supply to additional or ancillary devices that are connected via an outlet 708. The current limiting device 706 may be a secondary circuit breaker, positive temperature coefficient resistor, current detecting circuit or fuse. The current limitation for the additional devices is limited to the maximum current, which the operator 702 demands.

Figure 8:
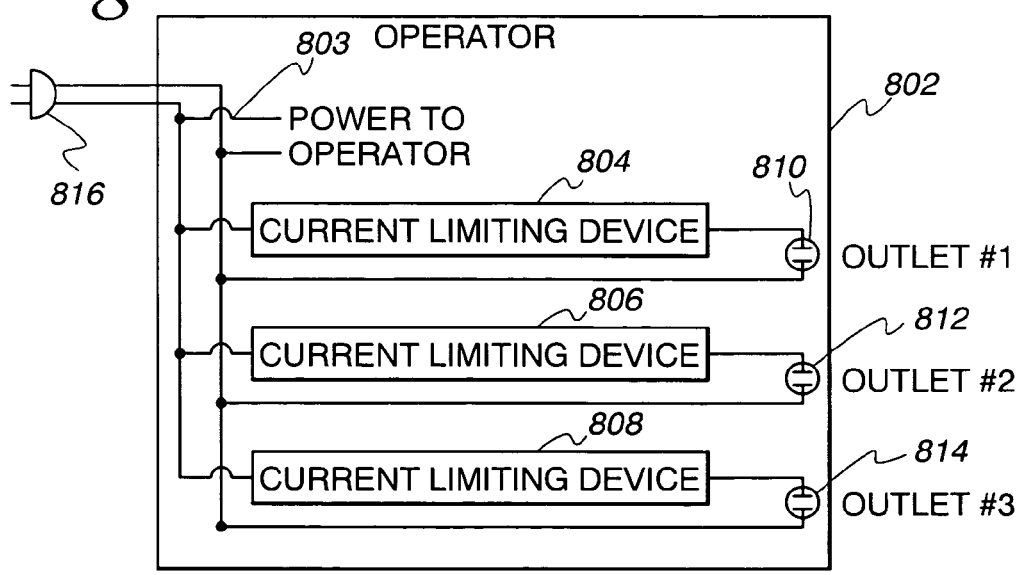
FIG. 8 is a system for controlling in the distribution of current according to the present invention.

Referring now to FIG. 8, another example of an operator with a current limiting device is described. A power plug 816 is placed in a power outlet to supply power and current to an operator 802 via power lines 803. The power outlet receives power and current from a mains supply. In one example, the mains supply may be the standard 110V residential supply in the United States. However, other examples of mains supplies are possible. Current limiting devices 804, 806, 808 supply and limit current to outlets 810, 812 and 814 respectively. The current limiting devices may be a secondary circuit breaker, positive temperature coefficient resistor, current detecting circuit or fuse. The outlets 810, 812 and 814 are connected to separate outside devices. The maximum current to each additional device is limited to the maximum current the operator 802 demands divided by the number of potential devices. The limit to the amount of current for each branch may be different and may be determined by a user.

Referring now to FIG. 9, another example of an operator with a current limiting device is described. A power plug 910 is placed in a power outlet to supply an operator 902 with power and current. The power outlet receives power and current from a mains supply. In one example, the mains supply may be the standard 110V residential supply in the United States. However, other examples of mains supplies are possible. The operator 902 includes a control circuit 904, a current limiting device 906 and an outlet 908 to additional devices (not shown). The current limiting device 906 may be a secondary circuit breaker, positive temperature coefficient resistor, current detecting circuit or fuse. The control circuit 904 controls the operation of the barrier movement portion of the barrier operator.

The current that a motor is allowed to absorb is limited by the limiting device 906. The limiting device 906 slows down the rate at which a motor (not shown) accelerates but allows for a higher amount of current for the additional devices. This approach may be used alone or in combination with other approaches described herein.

Referring now to FIG. 10, an example of an operator with another current limiting approach is described. A power plug 1008 is placed in a power outlet to supply an operator 1002. The power outlet receives power and current from a mains supply. In one example, the mains supply may be the standard 110V residential supply in the United States. However, other examples of mains supplies are possible. A power control element 1004 controls the amount of current supplied to outlet 1006. The outlet 1006 is connected to additional devices (not shown). In this approach, the power control element 1004 turns off the additional devices whenever the operator 1002 is required to move a barrier. This allows the barrier to have a full current supply, but at the same time, power the additional devices.

Referring now to FIG. 11, another example of an operator with current limiting devices is described. A power plug 1112 is placed in a power outlet to supply power and current to an operator 1102 via power lines 1103. The power outlet receives power and current from a mains supply. In one example, the mains supply may be the standard 110V residential supply in the United States. However, other examples of mains supplies are possible. The operator 1102 includes switches S1, S2 and S3 that are connected to outlets 1108, 1106 and 1104 respectively. The outlets 1104, 1106 and 1108 and switches S1, S2 and S3 are connected to control logic 1110. The control logic 1110, in one example, may be in the form of a microprocessor. As an example, the switches S1, S2, and S3 can be relays, triacs, other solid state relays or combinations of these devices.

The switches S1, S2 and S3 are operated by the control logic 1110. The control logic 1110 causes the switches S1, S2 and S3 to be opened and closed depending upon how the control logic has been programmed.

The control logic 1110 may also be responsible for phasing-in the operation of the additional devices. For example, the control logic 1110 may determine to activate a first additional device at time $t_1$, a second additional device a certain length of time later, and a third additional device another length of time later. Phasing-in the additional devices avoids current spikes that might be created at start-up if all the additional devices were activated at the same time. The additional devices may be any that have been described previously. In addition, the additional devices may include other barrier operators.

In this approach, information indicating the types of devices that are attached to the operator is supplied to the control logic 1110. By knowing, for instance, that the first device is a compressor, the second device is a florescent light and the third device is a heater, the control logic 1110 can make an intelligent decision as to which devices to activate based upon certain predefined circumstances. For instance, the control logic 1110 can activate the compressor and heater when the operator is activated but leave the light deactivated. The control logic 1110 can leave on the florescent light but not turn on the heater, if the approach would lower the current. Those skilled in the art will realized that the control logic 1110 can be configured in any number of ways to act upon the additional devices depending upon the desires of a user.

Referring now to FIG. 12, an example of an operator where information concerning additional devices is received by the operator is described. A power plug 1214 is connected to a power and current outlet and power and current is supplied to the operator via lines 1203. The power outlet receives power and current from a mains supply. In one example, the mains supply may be the standard 110V residential supply in the United States. However, other examples of mains supplies are possible. Outlets 1204, 1206, 1208 and 1212 are connected to additional devices.

The knowledge of the type of device can be given either through a third connection (information, power and ground) or through a specific connection to the additional device. The specific connection can be specific plugs or a specific wire connection for switched and unswitched power. The third connection (information) can be performed by a number of methods. Serial communication is one example as is having an impedance connected to that terminal to allow the impedance measurement to give the magnitude of current demanded by the products connected to the terminal.

While there has been illustrated and described particular embodiments of the present invention, it will be appreciated that numerous changes and modifications will occur to those skilled in the art, and it is intended in the appended claims to cover all those changes and modifications which fall within the true scope of the present invention.

What is claimed is:

1. A barrier operator comprising:
   a current limit portion coupled to a mains supply supplying electrical current, the mains supply having a predetermined maximum current limit for the barrier operator;
   a barrier operator portion coupled to the current limit portion and the mains supply, the barrier operator portion configured to actuate a movable barrier;
   wherein the current limit portion is configured to selectively apply and remove amounts of the electrical current supplied by the mains supply to the barrier operator and to at least two ancillary devices connected to the current limit portion via at least one outlet so that the electrical current does not exceed the predetermined maximum current limit, wherein the current limit portion is configured to remove amounts of electrical current from the at least two ancillary devices in response to allowing operation of the barrier operator portion without information regarding at least one of the at least two ancillary devices whenever operation of the barrier operator is required to actuate the movable barrier;
   wherein the current limit portion is configured to selectively apply amounts of electrical current to the at least two ancillary devices by phasing in the at least two ancillary devices in response to allowing operation of the barrier operator portion without exceeding the predetermined maximum current limit.

2. The operator of claim 1 wherein the current limit portion comprises a single current limit device.

3. The operator of claim 1 wherein the current limit portion comprises multiple current limit devices.

4. The operator of claim 2 wherein the current limit portion further comprises a controller.

5. The operator of claim 3 wherein the current limit portion further comprises a controller.

6. The operator of claim 1 wherein the at least two ancillary devices are selected from a group comprising a light, a heater, a sensor, a security device and a compressor.

7. The operator of claim 2 wherein the current limit device is selected from a group comprising a secondary circuit breaker, a positive temperature coefficient resistor, a current detecting circuit, a relay and a fuse.

8. The operator of claim 3 wherein the current limit device is selected from a group comprising a secondary circuit breaker, a positive temperature coefficient resistor, a current detecting a circuit, a relay and a fuse.

9. An operator comprising:
   a barrier operator portion for actuating a movable barrier;
   at least one current limit device configured to selectively apply and remove amounts of electrical current and power supplied by a mains supply, the mains supply having a predetermined maximum current limit for the operator, to the barrier operator and at least two ancillary devices coupled to the operator via at least one outlet, the electrical current supplied to the barrier operator and the at least two ancillary devices being limited so as not to exceed the predetermined maximum current limit, the at least one current limit device configured to remove amounts of the electrical current supplied to the at least two ancillary devices in response to allowing operation of the barrier operator portion without information regarding at least one of the at least two ancillary devices so as not to exceed the predetermined maximum current limit; and
   a controller coupled to the at least one current limit device for controlling the activation of the at least two ancillary devices;
   wherein the at least one current limit device is configured to selectively apply amounts of electrical current to the at least two ancillary devices by phasing in the at least two ancillary devices in response to allowing operation of the barrier operator portion without exceeding the predetermined maximum current limit.

10. The operator of claim 9 wherein the at least one current limit device comprises a single current limiting device.

11. The operator of claim 9 wherein the at least one current limit device comprises multiple current limiting devices.

12. A barrier operator system comprising:
   at least one ancillary device;
   an operator coupled to the at least one ancillary device via at least one outlet, the operator comprising a current limit portion coupled to a mains supply, the mains supply having a predetermined maximum current limit for the barrier operator;
   a barrier operator portion coupled to the current limit portion and the mains supply, the barrier operator portion actuating a movable barrier;
   wherein the current limit portion is configured to selectively apply and remove amounts of electrical current supplied by the mains supply to the barrier operator and to at least two ancillary devices so that the electrical current does not exceed the predetermined maximum current limit,
   wherein the current limit portion is configured to remove amounts of electrical current to the at least one ancillary device in response to allowing operation of the barrier operator portion without information regarding at least one of the at least two ancillary devices so that the electrical current does not exceed the predetermined maximum current limit; and
   wherein the at least one current limit portion is configured to selectively apply amounts of electrical current to the at least two ancillary devices by phasing in the at least two ancillary devices in response to allowing operation of the barrier operator portion without exceeding the predetermined maximum current limit.

13. The operator of system of claim 12 wherein the current limit portion of the operator comprises a single current limit device.

14. The system of claim 12 wherein the current limit portion of the operator comprises multiple current limit devices.

15. The system of claim 13 wherein the at least two ancillary devices are selected from a group comprising a light, a heater, a sensor, a security system and a compressor.

16. The system of claim 14 wherein the at least two ancillary devices are selected from a group comprising a light, a heater, a sensor, a security system and a compressor.

17. The system of claim 13 wherein the current limit portion of the operator is selected from a group comprising a switch, a secondary circuit breaker, a positive temperature coefficient resistor, a current detecting circuit, a switch, and a fuse.

18. The system of claim 14 wherein the current limit portion of the operator is selected from a group comprising a switch, a secondary circuit breaker, a positive temperature coefficient resistor, a current detecting circuit, a switch, and a fuse.

* * * * *

UNITED STATES PATENT AND TRADEMARK OFFICE
CERTIFICATE OF CORRECTION

PATENT NO. : 8,030,796 B2  Page 1 of 1
APPLICATION NO. : 10/930648
DATED : October 4, 2011
INVENTOR(S) : James J. Fitzgibbon, Robert J. Olmsted and Robert Daniel-Wayman It is certified that error appears in the above-identified patent and that said Letters Patent is hereby corrected as shown below:

IN THE CLAIMS:

Column 9, Claim 13, Line 5: Delete "operator of".

Signed and Sealed this
Sixth Day of March, 2012

David J. Kappos
*Director of the United States Patent and Trademark Office*